United States Patent [19]
Dörr et al.

[11] Patent Number: 4,582,481
[45] Date of Patent: Apr. 15, 1986

[54] PROCESS OF DRYING SULFIDE ORES IN DIRECT CONTACT WITH HOT DRYING GASES

[75] Inventors: Karl-Heinz Dörr, Mainz; Ulrich Sander, Friedrichsdorf; Alfons Schulte, Frankfurt am Main; Heinrich Traulsen, Schwalbach, all of Fed. Rep. of Germany

[73] Assignee: Metallgesellschaft Aktiengesellschaft, Frankfurt am Main, Fed. Rep. of Germany

[21] Appl. No.: 684,545

[22] Filed: Dec. 21, 1984

[30] Foreign Application Priority Data

Dec. 23, 1983 [DE] Fed. Rep. of Germany ....... 3346878

[51] Int. Cl.$^4$ ................ F27B 15/00; F26B 19/00; B01D 50/00; F01N 3/12
[52] U.S. Cl. ........................................ 432/14; 34/86; 422/168; 422/183; 432/105
[58] Field of Search ............... 432/14, 105; 422/160, 422/168, 173, 183; 34/86

[56] References Cited

U.S. PATENT DOCUMENTS

| | | | |
|---|---|---|---|
| 2,242,763 | 5/1941 | Smith | 23/177 |
| 3,169,853 | 2/1965 | Van Es | 75/9 |
| 4,077,841 | 3/1978 | Suprunov et al. | 159/47 R |
| 4,331,630 | 5/1982 | Van Pool | 422/183 |
| 4,462,977 | 7/1984 | Reed | 422/173 |

FOREIGN PATENT DOCUMENTS 1068678 11/1959 Fed. Rep. of Germany .
1102996 5/1955 France .

OTHER PUBLICATIONS

Metall, Band 37, No. 4, Apr. 1983, Seite 299, Berlin, DE; "We've Re-Defined Copper Smelting with Our New CONTOP Process".

*Primary Examiner*—John J. Camby
*Attorney, Agent, or Firm*—Sprung Horn Kramer & Woods

[57] ABSTRACT

The moist ores are dried in direct contact with hot dry tail gas from a contact process plant for producing sulfuric acid. The dried ores are roasted, the SO$_2$-containing gases produced by the roasting are processed in the contact process plant to produce sulfuric acid, and the tail gases from the contact process plant are heated up with surplus heat from the contact process plant. These heated tail gases are used to dry the moist ores.

6 Claims, 3 Drawing Figures

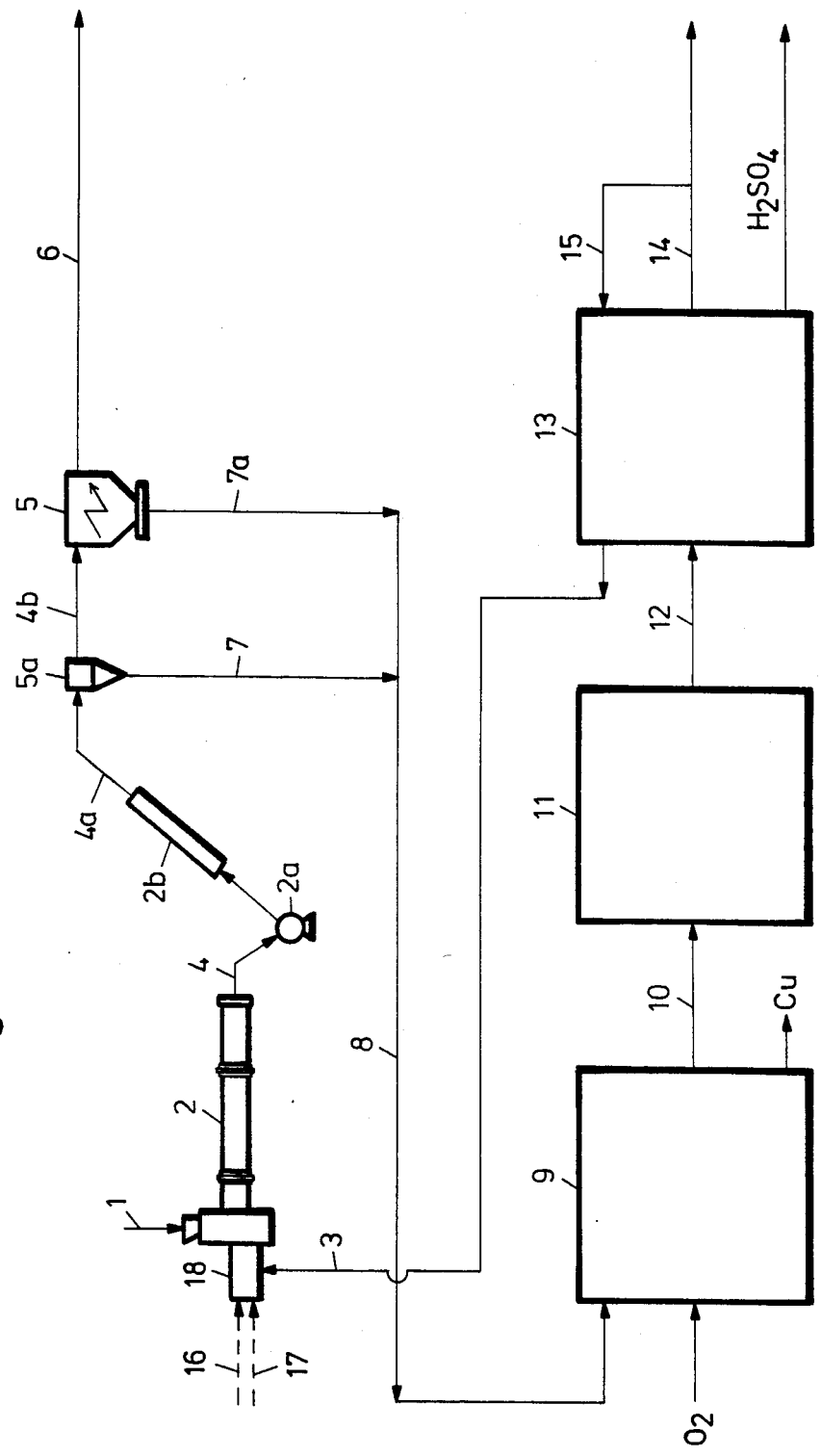

4,582,481

PROCESS OF DRYING SULFIDE ORES IN DIRECT CONTACT WITH HOT DRYING GASES

BACKGROUND OF THE INVENTION

1. Field of the Invention

This invention relates to a process of drying sulfide ores in direct contact with hot drying gases, wherein the sulfide ores are processed with production of $SO_2$-containing gases, sulfuric acid is produced from the $SO_2$-containing gases in a contact process plant, and the drying gases are heated up with surplus heat from the contact process plant.

2. Discussion of Prior Art

Sulfide ores or ore concentrates, such as copper, nickel, lead, tin and iron ores, and optional admixtures, such as sand, lime, and metal concentrates recovered from slags, must sometimes be dried before their metallurgical processing. The metallurgical processing may succeed a roasting treatment or the roasting may be effected at the same time as the metallurgical processing. The $SO_2$-containing gases thus produced are processed in contact process plants to produce sulfuric acid. Particularly in processes in which the roasting and metallurgical processing are performed at the same time, the material must be dried to a very low water content in order to ensure favorable ignition behavior of the ores. On the other hand, the ignitability of the ores must be taken into account during the drying because an ignition during drying must be prevented. This is ensured in that the inlet temperature of the drying gases is properly selected in consideration of the oxygen content of the gases and of the flow pattern of the gas and solids. Drying is generally effected with hot flue gases, which are produced by a combustion of solid fuels. Because a considerable quantity of heat is needed for the evaporation of the water, primary energy is required in a large quantity.

From "Metall", Vol. 37, No. 4, April 1983, page 299 it is also known to use hot air for a drying of copper ores and to heat up said air with surplus heat from the contact process plant. That practice saves a corresponding quantity of primary energy. But that saved quantity of primary energy must be replaced by high-temperature surplus heat, which becomes available in the contact process plant during the processing of gases having a high $SO_2$ content and which could otherwise by used to produce high-pressure steam.

It is an object of the invention to minimize the use of high-grade heat for drying.

SUMMARY OF INVENTION

This object is accomplished in accordance with the invention in that hot dry tail gases from the contact process plant are used as drying gases.

The term "tail gas" describes the dry exhaust gases which are discharged from the $SO_3$ absorber succeeding the last contacting tray of the contact process plant and are substantially free of $SO_2$ and $SO_3$. These gases generally become available at a temperature of 60° to 80° C. although their temperature may rise above 140° C. if the absorption is effected at elevated temperatures. Said gases have only a relatively low content of residual oxygen. The tail gas is heated up by an indirect heat exchange with surplus heat form the contact process plant.

In accordance with a preferred further feature, the tail gases are supplied to the drying equipment at a rate which corresponds to the specific gas flow rating of the drying equipment, the tail gas which is used is heated with surplus heat from the contact process plant to such a temperature that heat in the quantity required for an evaporation of the water is supplied to the drying equipment, and the humid drying gases leaving the drying equipment are at a temperature which is only so much higher than the dew point temperature of the humid drying gases that there is no condensation in the succeeding equipment. The "specific gas flow rating" of the drying equipment is the highest permissible volumetric gas rate per cross-sectional area of gas flow in the drying equipment employed, also in consideration of the permissible loading of the gaseous effluent with entrained solids and in consideration of the energy required for gas transport. Even in the succeeding equipment, such as dust collectors, the temperature of the humid gases leaving the drying equipment must not drop below the dew point temperature. On the other hand, the outlet temperature should be as low as possible because this will minimize the heat losses which are due to the gaseous effluent and the solids being discharged.

The term "surplus heat form the contact process plant" describes the heat which is not required to heat $SO_2$-containing gases in order to maintain a thermally self-sufficient operation in the contact process plant and which must be removed from the contact process system. The rate at which surplus heat becomes available depends on the $SO_2$ concentration and on the rate of contact process gas. If the ore has a relatively high sulfur content, the surplus heat which becomes available in the contact process plant used in the integrated process complex may be sufficient for a complete drying of the ore which is supplied, even if the $SO_2$ concentration is relatively low and amounts, e.g., to 8 to 10 vol.% $SO_2$. The higher the $SO_2$ concentration of the contact process gases, the higher will be the rate of surplus heat. The surplus heat may be removed from the contact process system at a temperature between about 150° and 700° C. and its lower temperature limit is substantially determined by the dew point temperature of the $SO_3$-containing gases. The utilization of heat can be greatly improved in that drying is effected with dry gases which are supplied at a relatively high rate and are at a temperature which is substantially below the highest temperature that is permissible in view of the igniting behavior of the ores.

A further preferred feature resides in that the tail gas supplied to the drying equipment is preheated with surplus heat from the contact process plant and is subsequently indirectly heated to the required inlet temperature for the drying equipment. That practice, which requires an additional heat exchanger, is adopted if adequate surplus heat is not available from the contact process system. The indirect heating ensures an optimum preservation of the advantage afforded by the use of perfectly dry tail gases.

In accordance with a further feature the tail gas supplied to the drying equipment is preheated with surplus heat from the contact process plant and is subsequently heated by a direct admixing of hot flue gases to the inlet temperature for the drying equipment, the mixed gases are supplied to the drying equipment at a volumetric rate which corresponds to the specific gas flow rating of the drying equipment, and the inlet temperature is so adjusted that the quantity of heat required for an evaporation of the water is supplied to the drying equipment and the outlet temperature of the humid drying gases leaving the drying equipment is sufficiently higher than the dew point temperature of the drying gases. In that case the requirements described hereinbefore are also properly met.

The flue gases are directly admixed when they are at their highest temperature because the rate at which flue gases are admixed can be minimized in that case so that the rate at which water is introduced is low too. Flue gases are produced by the combustion of fossil fuels and inevitably contain water. The dry tail gases from the contact process plant are supplied instead of undried secondary air to the combustion chamber in which the flue gases are produced. That procedure is adopted if the surplus heat from the contact process plant is not sufficient for the drying of the ores and permits the advantages afforded by the drying with dry tail gases to be substantially preserved.

In accordance with a further preferred feature the outlet temperature of the humid drying gases leaving the drying equipment is 30° to 70° C. above the dew point temperature of the humid gaseous effluent. In that case the heat supplied by the drying gases is utilized to a high degree and a temperature drop below the dew point temperature is reliably avoided also in the succeeding equipment.

Drying is preferably carried out in equipment which has a high specific gas flow rating and can be operated with a low temperature difference between the inlet and outlet temperature of the gases. Such equipment may consist, e.g., of a suspension dryer, a fluidized bed dryer or a rotary drum dryer.

BRIEF DESCRIPTION OF DRAWINGS

The invention will be explained more in detail with reference to drawings and examples.

FIG. 3 is a flow scheme showing a combination of a rotary drum dryer and a suspension dryer.

DESCRIPTION OF SPECIFIC EMBODIMENTS

Figure 1:
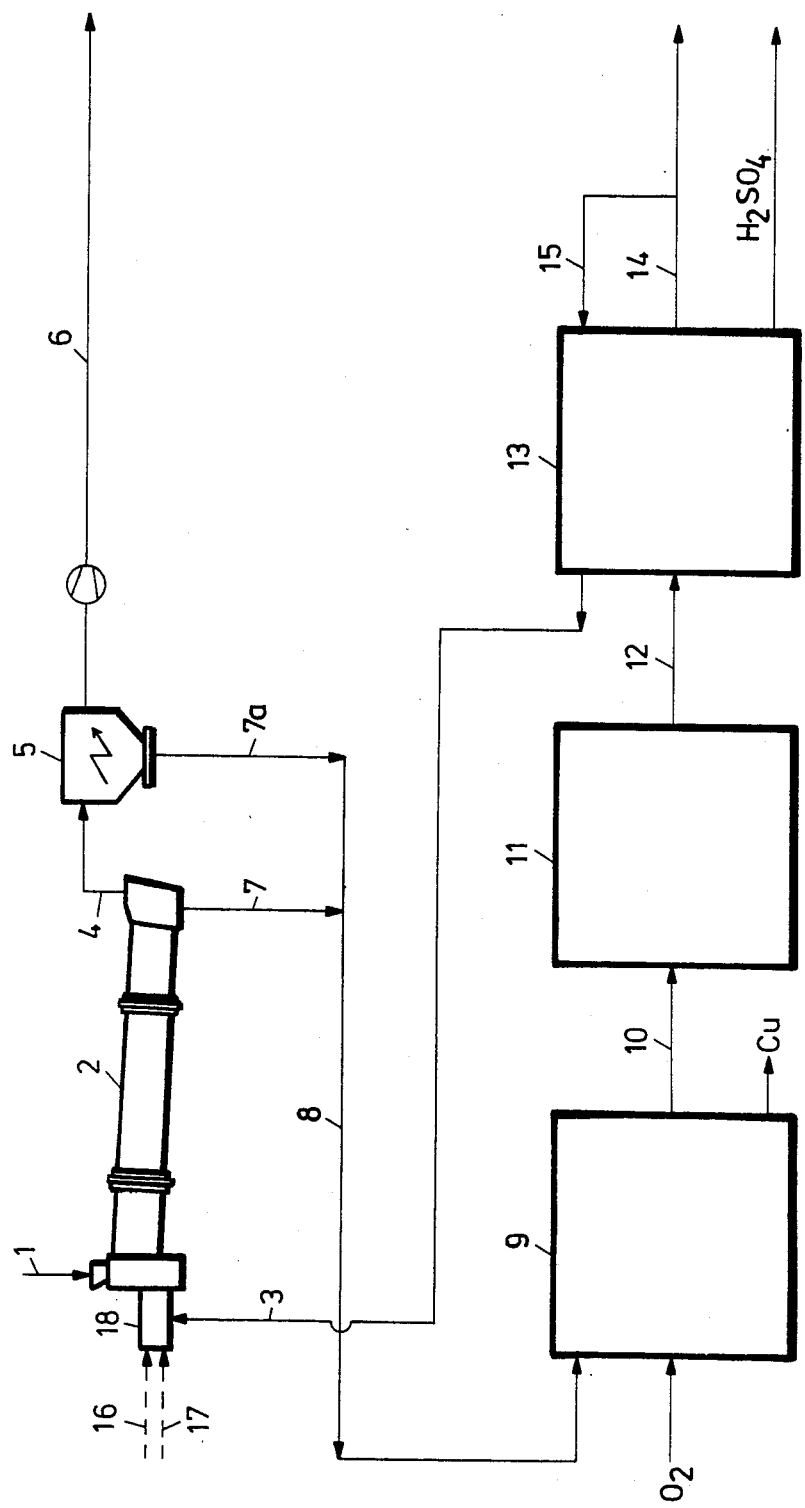
FIG. 1 is a flow scheme illustrating the smelting of a copper ore concentrate in combination with the production of sulfuric acid in a process in which the concentrate is dried in a rotary drum dryer.

Referring to the drawings, a mixture of ore concentrate and admixtures is charged by a feeder 1 into the dryer 2, 2a, 2b, 2c. Hot tail gas is supplied to the dryer via a line 3. The waterladen exhaust gas leaving the dryer is delivered in line 4 to a gas purifier 5 and from the latter in line 6 to a chimney. The dried mixed solids 7a collected in the gas purifier 5 are supplied in line 8 to the copper smelter 9. A smelting is effected in a suspension smelting furnace, which is succeeded by a converter supplied with commercially pure oxygen. The resulting gases have a high $SO_2$ content and are supplied in line 10 to the gas purifier 11. Air is admixed to the purified gases in order to adjust the required ratio of $O_2$ to $SO_2$. The gases are then supplied in line 12 to the contact process plant 13 for producing sulfuric acid. The tail gas leaves the contact process plant 13 in line 14. A branch stream of the tail gas is recycled in line 15 to the contact process plant 13 and is heated up therein. The tail gas which has been heated up is supplied in line 3 to the dryer 2. If the surplus heat of the contact process plant 13 is not sufficient to heat, the branch stream of tail gas to the inlet temperature required for the drying equipment, fuel oil in line 16 and primary air in line 17 is supplied to the combustion chamber 18 for the production of flue gases.

FIG. 1 shows a rotary drum dryer 2 having a solids discharge port 7 and a gas outlet line 4 as separate elements.

Figure 2:
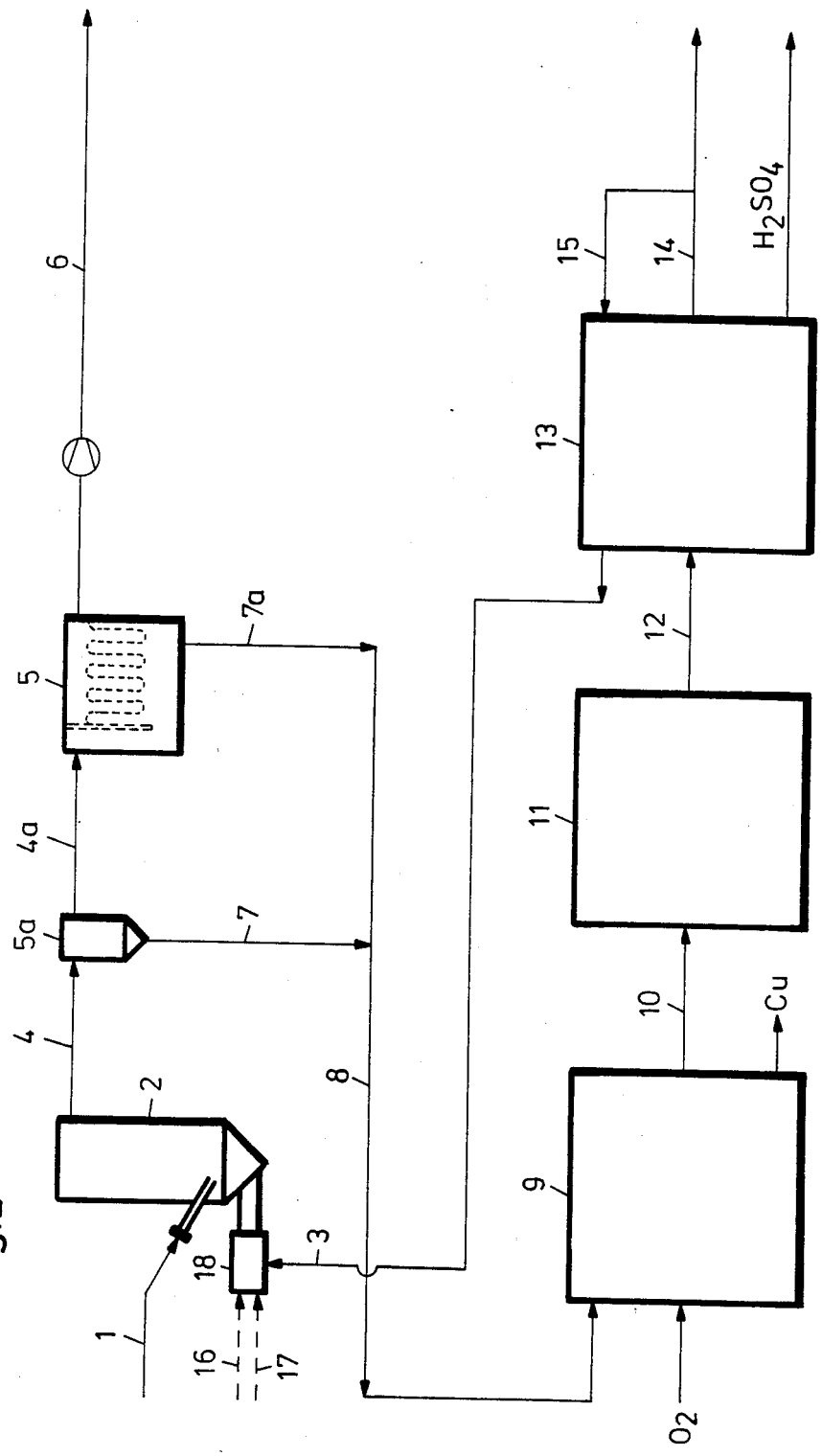
FIG. 2 is a flow scheme showing a fluidized bed dryer.

FIG. 2 shows a fluidized bed dryer 2a, in which all solids together with the gaseous effluent are supplied in line 4a to the bag house 5. All solids which have been collected are delivered via line 7a to line 8.

FIG. 3 shows a rotary drum dryer and a suspension dryer used in combination. From the short rotary drum 2, the predried solids and the gas enter the cage mill 2a, in which the drying is continued and coarse particles are ground. Solids and gas then enter the suspension dryer 2b for a final drying. Solids and gas are supplied in line 4a to a cyclone separator 5a, in which a large part of the solids is collected and delivered via line 7 to line 8. The gas and the remaining solids are supplied in line 4b to the dust-collecting electrostatic precipitator 5.

In the examples, a copper concentrate was used which had the following composition based on dry ore:
Copper: 25%
Iron: 32%
Sulfur: 34.5%
The concentrate had a moisture content of 8%.

The admixtures used consisted of sand having a water content of 8% and of a slag concentrate derive from slags and having a water content of 12%.

On a dry basis, 51,800 kg copper concentrate, 7,900 kg sand and 2,600 kg slag concentrate were mixed per hour. The feeding temperature was 20° C.

The resulting mixture having a water content of 8.1% was supplied to the dryer at a rate of 67,800 kg/h.

The contact process plant operated in the integrated process complex produced sulfuric acid at a rate of 938,000 kg/h $H_2SO_4$ of 100% concentration.

| | | | Examples 1 to 3 (FIG. 1) | | | Examples 4 to 6 (FIG. 2) | | | Examples 7 to 9 (FIG. 3) | | |
|---|---|---|---|---|---|---|---|---|---|---|---|
| | | | | | | Example | | | | | |
| Item No. | Energy-determining parameters | | 1 Flue gas | 2 Tail gas | 3 Tail gas + flue gas | 4 Flue gas | 5 Tail gas | 6 Tail gas + flue gas | 7 Flue gas | 8 Tail gas | 9 Tail gas + flue gas |
| 8 | Solids rate | t/h | 62.5 | 62.5 | 62.5 | 62.5 | 62.5 | 62.5 | 62.5 | 62.5 | 62.5 |
| | $H_2O$ - residual moisture | % $H_2O$ | 0.3 | 0.3 | 0.3 | 0.3 | 0.3 | 0.3 | 0.3 | 0.3 | 0.3 |
| | Temperature | °C. | 100 | 80 | 90 | 100 | 95 | 95 | 75 | 75 | 75 |
| 18 | Gas rate (as dry gas) | sm³/h | 38,330 | 39,960 | 40,600 | 57,140 | 59,310 | 59,000 | 55,100 | 59,100 | 57,600 |
| | $H_2O$ content | g$H_2O$/sm³ of dry gas | 39 | 0 | 8 | 34 | 0 | 2 | 33 | 0 | 5 |
| | Gas temperature | °C. | 450 | 408 | 423 | 320 | 314 | 315 | 300 | 286 | 300 |
| 4 | Gas rate (as | sm³/h | 47,260 | 46,860 | 47,430 | 66,596 | 66,280 | 66,160 | 64,300 | 66,000 | 65,000 |

-continued

|  |  |  | Examples 1 to 3 (FIG. 1) | | | Examples 4 to 6 (FIG. 2) | | | Examples 7 to 9 (FIG. 3) | | |
|---|---|---|---|---|---|---|---|---|---|---|---|
|  |  |  | Example | | | | | | | | |
| Item No. | Energy-determining parameters |  | 1 Flue gas | 2 Tail gas | 3 Tail gas + flue gas | 4 Flue gas | 5 Tail gas | 6 Tail gas + flue gas | 7 Flue gas | 8 Tail gas | 9 Tail gas + flue gas |
|  | dry gas) $H_2O$ content | g$H_2O$/s$m^3$ of dry gas | 179 | 134 | 140 | 127 | 90 | 93 | 130 | 91 | 98 |
|  | Dew point temperature | °C. | 64 | 53 | 54 | 52 | 46 | 47 | 53 | 46 | 48 |
|  | Gas temperature | °C. | 120 | 100 | 110 | 100 | 95 | 95 | 80 | 80 | 80 |
| 16 | Fuel oil rate | kg/h | 580 | — | 170 | 610 | — | 52 | 550 | — | 157 |
| 17 | Combustion air rate (as dry air) | s$m^3$/h | 38,330 | — | 5,230 | 57,625 | — | 1,610 | 55,550 | — | 4,740 |
|  | $H_2O$ content | g$H_2O$/s$m^3$ of dry gas | 20 | — | 20 | 20 |  | 20 | 20 | — | 20 |
|  | Air temperature | °C. | 20 | — | 20 | 20 |  | 20 | 20 | — | 20 |
| 3 | Tail gas rate (as dry gas) | s$m^3$/h | — | 39,961 | 40,603 | — | 59,310 | 57,500 | — | 59,123 | 53,000 |
|  | $H_2O$ content | g$H_2O$/s$m^3$ of dry gas | — | 0 | 0 | — | 0 | 0 | — | 0 | 0 |
|  | Tail gas temperature | °C. | — | 450 | 405 | — | 320 | 289 | — | 300 | 247 |
| 12 | $SO_2$ concentration | vol. % $SO_2$ | 10.5 | 11.2 | 10.5 | 10.5 | 11.8 | 10.5 | 9.0 | 10.8 | 9.0 |
|  | Gas rate (as dry gas) | s$m^3$/h | 84,120 | 79,000 | 84,120 | 84,120 | 74,610 | 84,120 | 97,552 | 81,926 | 97,552 |
| 14 | Tail gas rate (as dry gas) | s$m^3$/h | 75,540 | 61,830 | 75,540 | 75,540 | 61,380 | 75,540 | 84,315 | 68,670 | 84,315 |
|  | Tail gas temperature | °C. | 70 | 70 | 70 | 70 | 70 | 70 | 70 | 70 | 70 |

The advantages afforded by the invention reside in that the consumption of expensive primary energy is avoided or reduced and the consumption of high-grade surplus heat from the contact process plant is greatly reduced by the use of the low-grade heat contained in the tail gases.

What is claimed is:

1. In a process of drying sulfide ore in direct contact with hot drying gases in drying equipment, wherein the process includes
    processing sulfide ore to produce $SO_2$-containing gases,
    producing sulfuric acid from the $SO_2$-containing gases in a contact process plant, and
    heating up the drying gases with surplus heat from the contact process plant,
    the improvement which comprises directing hot dry tail gases from the contact process plant to the drying equipment as a source of said drying gases.

2. A process according to claim 1, wherein the tail gases are supplied to the drying equipment at a rate which corresponds to the specific gas flow rating of the drying equipment, the tail gas which is used is heated with surplus heat from the contact process plant to such a temperature that heat in the quantity required for an evaporation of water in said sulfide ore is supplied to the drying equipment, and the humid drying gases leaving the drying equipment are at a temperature sufficiently higher than the dew point temperature of the humid drying gases that there is no condensation in succeeding equipment.

3. A process according to claim 2, wherein the tail gas supplied to the drying equipment is preheated with surplus heat from the contact process plant and is subsequently indirectly heated to the required inlet temperature for the drying equipment.

4. A process according to claim 1, wherein the tail gas supplied to the drying equipment is preheated with surplus heat from the contact process plant and is subsequently heated by a direct admixing of hot flue gases to the inlet temperature for the drying equipment, the mixed gases are supplied to the drying equipment at a volumetric rate which corresponds to the specific gas flow rating of the drying equipment, and the inlet temperature is so adjusted that the quantity of heat required for an evaporation of the water is supplied to the drying equipment and the outlet temperature of the humid drying gases leaving the drying equipment is sufficiently higher than the dew point temperature of the drying gases to avoid substantial condensation of said water.

5. A process according to claim 2 wherein the outlet temperature of the humid drying gases leaving the drying equipment is 30° to 70° C. above the dew point temperature of the humid gaseous effluent from said drying zone.

6. A method of processing sulfide ores for production of sulfuric acid, wherein the method comprises
    drying sulfide ores in direct contact with hot drying gases,
    processing the sulfide ores to produce $SO_2$-containing gases,
    producing sulfuric acid from the $SO_2$-containing gases in a contact process plant, and
    heating up the drying gases with surplus heat form the contact process plant, wherein the drying gases comprise hot dry tail gases from the contact process plant.

* * * * *